United States Patent
Tiemens

(10) Patent No.: US 10,823,602 B2
(45) Date of Patent: Nov. 3, 2020

(54) RECEIVING VESSEL FOR THE GRAVIMETRIC CALIBRATION OF PIPETTES

(71) Applicant: Mettler-Toledo GmbH, Greifensee (CH)

(72) Inventor: Roland Tiemens, Bauma (CH)

(73) Assignee: Mettler-Toledo GmbH, Greifensee (CH)

( * ) Notice: Subject to any disclaimer, the term of this patent is extended or adjusted under 35 U.S.C. 154(b) by 156 days.

(21) Appl. No.: 15/724,716

(22) Filed: Oct. 4, 2017

(65) Prior Publication Data

US 2018/0100757 A1    Apr. 12, 2018

(30) Foreign Application Priority Data

Oct. 7, 2016  (EP) .................................. 16192804

(51) Int. Cl.
*G01F 25/00* (2006.01)
*G01G 21/22* (2006.01)
(Continued)

(52) U.S. Cl.
CPC .......... *G01F 25/0092* (2013.01); *B01L 3/021* (2013.01); *B01L 3/508* (2013.01); *G01G 17/04* (2013.01); *G01G 21/22* (2013.01); *B01L 2200/025* (2013.01); *B01L 2200/0684* (2013.01); *B01L 2200/0689* (2013.01); *B01L 2200/148* (2013.01); *B01L 2300/046* (2013.01);
(Continued)

(58) Field of Classification Search
CPC ................ G01F 25/0092; B01L 3/021; B01L 2300/046; B01L 2200/025; B01L 2200/0689; B01L 3/508; B01L 2200/0684; B01L 2300/12; B01L 2300/0832; G01G 21/22; G01G 17/04; G01G 23/01; G01G 21/286; G01G 23/48; G01N 9/26

See application file for complete search history.

(56) References Cited

U.S. PATENT DOCUMENTS

| | | | |
|---|---|---|---|
| 7,829,800 B2* | 11/2010 | Thiel | G01G 17/06 177/180 |
| 2010/0114507 A1* | 5/2010 | Bachmann | G01G 17/06 702/55 |

(Continued)

FOREIGN PATENT DOCUMENTS

WO    2013/076171 A1    5/2013

*Primary Examiner* — Brandi N Hopkins
(74) *Attorney, Agent, or Firm* — Standley Law Group LLP; Jeffrey S. Standley; Stephen L. Grant

(57) ABSTRACT

A receiving vessel (21) for the gravimetric calibration and verification of pipettes, whose purpose is to be placed on a load receiver (33) of a balance (40) and to receive and hold test liquid (29) discharged from pipettes that are being calibrated or verified, is configured as evaporation-trapping device, wherein the receiving vessel includes a beaker (22), a lid (23) with a passage opening (25), and a receiving tube (28) that is held in place in the passage opening, passing through the latter into the interior of the beaker. The receiving vessel is adapted to mechanically engage the weighing pan or load receiver when the receiving vessel is set on the weighing pan or load receiver. This ensures a secure placement of the receiving vessel in a defined, reproducible position on the weighing pan or load receiver.

15 Claims, 6 Drawing Sheets

(51) Int. Cl.
*G01G 17/04* (2006.01)
*B01L 3/02* (2006.01)
*B01L 3/00* (2006.01)

(52) U.S. Cl.
CPC ... *B01L 2300/0832* (2013.01); *B01L 2300/12* (2013.01)

(56) References Cited

U.S. PATENT DOCUMENTS

2011/0094319 A1* 4/2011 Yong ................. A61B 10/0045
  73/864.63
2015/0140681 A1* 5/2015 Meng .................... B01L 3/5023
  436/501

* cited by examiner a)

b)

c)

RECEIVING VESSEL FOR THE GRAVIMETRIC CALIBRATION OF PIPETTES

CROSS-REFERENCE TO RELATED APPLICATIONS

This application claims priority to European Application No. 16192804.9, filed on 7 Oct. 2016, the content of which is incorporated by reference as if fully recited herein.

TECHNICAL FIELD

The disclosed embodiments relate to a receiving vessel used in the gravimetric calibration and verification of pipettes. The receiving vessel, when placed on a load receiver of a balance, receives and holds a test liquid that is discharged from a pipette that is being calibrated or verified. The receiving vessel is configured to trap evaporation of the liquid. The receiving vessel is designed to be secured, by a mechanical engagement, to the weighing pan or load receiver, so as to provide a defined, reproducible position on the weighing pan or load receiver with each use.

BACKGROUND OF THE ART

A pipette is a laboratory tool commonly used in chemistry, biology and medicine to pick up, transport and dispense a measured volume of liquid. Pipettes come in several designs for various purposes with differing levels of accuracy and precision, from single-piece glass pipettes to more complex adjustable or electronic pipettes. In the gravimetric calibration of a pipette, distilled water of a controlled temperature is aspirated (suctioned) from a supply beaker into a holding chamber of the pipette, such as for example the space contained in the tip of a piston pipette, and then immediately discharged into a receiving vessel which is seated on the weighing pan of an analytical balance. Based on the weight difference of the receiving vessel before and after receiving the distilled water discharged from the pipette, the volume of the amount of dispensed water can be calculated, and the relationship between the dispensed volume and a graduation mark or other volume indicator on the pipette can be calibrated or verified. The foregoing sequence of steps is usually repeated a prescribed number of times for the same pipette, and the result is stated in terms of a mean value and standard deviation.

Pipettes, especially those used in regulated areas, are at least calibrated once a year, mostly according to the international standard ISO 8655, "Piston-Operated Volumetric Apparatus". Especially for pipettes that handle very small volumes of liquid, the calibration tolerances set by this standard are very demanding, requiring the use of a high-accuracy analytical balance and detailed, reproducible procedures. For example, the finest micropipette covered by the tolerance specifications of ISO 8655 has a nominal volume of 1 microliter ($\mu$l), a maximum permissible systematic error of 0.05 $\mu$l and a maximum permissible random error of 0.05 $\mu$l. The corresponding nominal weight for the distilled water is 1 milligram (mg), with a maximum permissible systematic error of 0.05 mg (50 $\mu$g) and a maximum permissible random error of 0.05 mg (50 $\mu$g). These tolerances dictate the degree of accuracy that is required of the equipment and procedures used for the calibration and verification of pipettes.

A critical factor affecting the accuracy of a pipette calibration or verification is the amount of evaporation from the water in the receiving vessel that occurs between the weighings of the receiving vessel before and after receiving the distilled water discharged from the pipette. The loss of weight due to evaporation will cause a negative error in the result. Especially in the calibration of micropipettes, the amount of this error is not negligible and, furthermore, it varies depending on the time elapsed between the two weighings and depending on the temperature and relative humidity of the atmosphere surrounding the receiving vessel.

According to state-of-the-art practice, as understood by the inventors, the evaporation error in pipette calibrations is minimized by a procedural measure, wherein the operating cycle of weighing the receiving vessel, discharging the distilled water from the pipette, and reweighing the receiving vessel is strictly timed, so that the amount of evaporation will be the same for every operating cycle. The actual quantity of water that evaporates during each cycle is estimated by intermittently carrying out a so-called "simulated" measurement cycle which is exactly identical to an actual calibration cycle except that no water is discharged from the pipette into the receiving vessel. The result of the simulated cycle represents the amount of the evaporation loss, which is then added as a correction to the raw calibration results.

In view of the complexity of a pipette calibration procedure as described above which includes performing regular time cycle of manual operations with the pipette and the balance, recording the weighing results, and performing computations with them, calibrations or verifications of pipettes are usually carried out with a computer-assisted pipette-calibration weighing system wherein an analytical balance is interfaced with a personal computer which guides the human operator through the timed steps, transfers the weighing results from the balance to the computer and performs the computations, thus ensuring the best possible level of control over the uniformity and reproducibility of the pipette calibration process.

Within the field of pipette calibration, the present invention is specifically focused on an apparatus-oriented physical feature that has the purpose of minimizing the amount of evaporation from the surface of the distilled water inside the receiving vessel.

According to the existing state of the art, an analytical balance used for pipette calibrations can be equipped with a so-called evaporation trap, an accessory kit for analytical balances which is commercially available from major laboratory instrument manufacturers including the assignee of the present invention. In principle, as illustrated in FIG. 1, an evaporation trap for the gravimetric calibration of pipettes is an enclosed chamber that is installed inside the draft shield compartment of the balance and surrounds the load receiver on which a receiving vessel is seated. The enclosure has an opening on top through which the distilled water contained in the pipette being calibrated is discharged into the receiving vessel. On the inside wall of the evaporation trap enclosure, a ring-shaped open tub is formed which can be filled with tap water. The evaporation from this tap water supply in the ring-shaped open tub creates and maintains a high relative humidity (i.e. a near-saturated $H_2O$ vapor pressure) inside the evaporation trap chamber, whereby the rate of evaporation from the surface of the distilled water in the receiving vessel is minimized.

In cases where an analytical balance is not dedicated full-time to the process of performing pipette calibrations but has to be shared for other applications, a state-of-the-art evaporation trap kit presents the problem of being relatively complicated and time-consuming to install and uninstall every time the balance is switched between its normal laboratory weighing function and pipette calibration. In essence, converting an analytical balance into a dedicated workstation for pipette calibration involves the steps of: a) exchanging the standard weighing pan of the balance against a special load receiver for the receiving vessel, b) seating the receiving vessel of the evaporation trap kit in the special load receiver, c) putting the evaporation trap enclosure in place over the special load receiver and the receiving vessel, and d) filling the ring-shaped open tub of the evaporation trap enclosure with tap water.

Among commercially available state-of-the-art evaporation trap kits of the type just described, one of the models manufactured by the assignee of the present invention includes a receiving vessel that is designed to keep at least part of the evaporation trapped inside the receiving vessel (see FIG. 2). In the practical experience of users and in tests conducted by the applicant, this specific type of receiving vessel was found to be so effective in reducing the rate of evaporation that the evaporation enclosure could be left off without compromising the accuracy of the pipette calibration process. The steps of putting the evaporation trap enclosure in place over the receiving vessel and filling the ring-shaped open tub of the evaporation trap enclosure with tap water can thus be dispensed with, but the exchange of the standard weighing pan against a special load receiver for the receiving vessel is still cumbersome and undesirable for the user.

In view of this drawback of the current state of the art, it is therefore the object of the present invention to provide a better solution for minimizing the amount of evaporation of test liquid from the receiving vessel in the gravimetric calibration or verification of pipettes.

SUMMARY

According to the invention, this task is solved by an evaporation-trapping receiving vessel as set forth in the appended claims, as are further developed embodiments, details and refinements of the invention are covered in the dependent claims.

A receiving vessel for the gravimetric calibration and verification of pipettes, whose purpose is to be placed on a load receiver of a balance and to receive and hold test liquid discharged from pipettes that are being calibrated or verified, is configured as an evaporation-trapping device with a beaker, a lid with a passage opening, and a receiving tube that is held in place in the passage opening, passing through the latter into the interior of the beaker. The evaporation-trapping receiving vessel according to the invention includes position-securing means which are designed to enter into a mechanical engagement with the weighing pan or load receiver of the balance when the receiving vessel is set on the weighing pan or load receiver, in order to ensure a secure placement of the receiving vessel in a defined, reproducible position on the standard weighing pan or load receiver.

In preferred embodiments of the invention, the position-securing means are configured as projections such as ridges or posts formed at the base of the receiving vessel and designed to engage the interstices of a grate-shaped load receiver of an analytical balance. The defined reproducible placement of the receiving vessel on the load receiver is essential in the process of gravimetric pipette calibration, because a position change of the receiving vessel on the load receiver between the two weighings before and after discharging the test fluid from a pipette into the receiving vessel could introduce a significant error into the calculation of the relatively small difference between the two weighings. In the absence of the position-securing means, such a position shift of the receiving vessel on the load receiver could be caused for example by wiping the tip of a pipette against the inside of the receiving tube and thereby pushing the receiving vessel out of place.

The beaker and/or the lid of the receiving vessel are preferably made of an electrically conductive material to avoid the accumulation of electrostatic charges which could cause weighing errors. At the same time, the overall weight of the entire receiving vessel filled with test liquid needs to be less than the load capacity of the analytical balance on which the pipette calibrations are to be performed. Preferably, the beaker and/or the lid are of thin-walled aluminum construction or made of a conductive or at least antistatic plastic material.

A receiving vessel according to the invention preferably includes a liner insert for the beaker. The purpose of this replaceable beaker liner is to prevent corrosion of the aluminum beaker by test liquid, particularly if test liquid is left sitting in the beaker over extended time periods.

In preferred embodiments of the invention, the receiving tube is designed and arranged to descend far enough inside the receiving vessel so that the lower end of the receiving tube held inside the receiving vessel. Thus, only the small surface area of the test liquid inside the receiving tube is directly exposed to the ambient atmosphere, whereby the amount of evaporation escaping into the ambient atmosphere is minimized. The evaporation from the ring-shaped surface area delimited by the outside wall of the receiving tube and the inside wall of the beaker is trapped in the enclosed space under the lid, and the weight of the trapped evaporation is therefore included in the weight that is registered by the balance.

Preferably, the lid of the receiving vessel includes at least one small vent opening allowing the escape of air that has been displaced by test liquid during a pipette calibration.

To be held in place in the passage opening of the lid, the receiving tube may be an integral piece of the lid, solidly joined to the lid, or releasably connected to the lid.

According to a preferred embodiment of the invention, the lid has a collar flange surrounding the passage opening and the receiving tube is tightly held and sealed in the collar flange by means of a seal ring.

In preferred embodiments of the invention the receiving tube is made of a transparent material, preferably glass. A transparent receiving tube has the advantage that the tip of a pipette being discharged into the receiving tube remains fully visible to the operator.

The major advantage of the evaporation-trapping device of the present invention over the state of the art is its simplicity and ease of use, which makes it particularly suitable for laboratories where an analytical balance is not dedicated full-time to the process of performing pipette calibrations but has to be shared for other applications. By using a receiving vessel which also performs the evaporation-trapping function the evaporation-trapping enclosure is made redundant and can therefore be dispensed with, which removes the spatial constraints that such an enclosure puts on the weighing pan. Consequently, there is no need to exchange the standard weighing pan against a special load receiver. To perform the task of pipette calibration, one only has to place the receiving vessel of the present invention on the standard weighing pan of the laboratory balance.

In regard to its functional purpose of minimizing the rate of evaporation, the evaporation-trapping receiving vessel of the present invention was found to be at least on a par with the aforementioned evaporation trap of the prior art. In a comparison test, the rate of weight loss due to evaporation was tested with a) an open beaker without lid, b) an evaporation-trapping device of the prior art with an evaporation-trapping enclosure, and c) an evaporation-trapping receiving vessel of the present invention. The evaporation-trapping receiving vessel of the present invention proved equally effective as the prior-art device in reducing the rate of weight loss due to evaporation by an order of magnitude in comparison to an open beaker without a lid. Thus, the improvement in simplicity and ease of use of the evaporation-trapping receiving vessel of the present invention is gained without compromising its functional performance in comparison to a state-of-the-art evaporation trap.

The full scope of the invention also extends to a method for the gravimetric calibration and verification of pipettes, wherein the method steps include:

- providing a receiving vessel according to one of the embodiments described hereinabove,
- providing a balance having a weighing pan or load receiver designed to mechanically engage the position-securing means of the receiving vessel,
- placing the receiving vessel onto the weighing pan or load receiver,
- discharging test liquid from a pipette to be calibrated or verified into the receiving vessel,
- registering the weight of the receiving vessel as measured by the balance before and after receiving the discharge of test liquid, and
- based on the weight difference of the receiving vessel before and after receiving the discharge of test liquid and based on a known formula for converting weight to volume of test liquid, determining the volume of test liquid dispensed from the pipette into the receiving vessel.

BRIEF DESCRIPTION OF THE DRAWINGS

The evaporation-trapping device according to the invention will be described hereinafter through embodiments shown schematically in the drawings, wherein.

DETAILED DESCRIPTION

Figure 1:
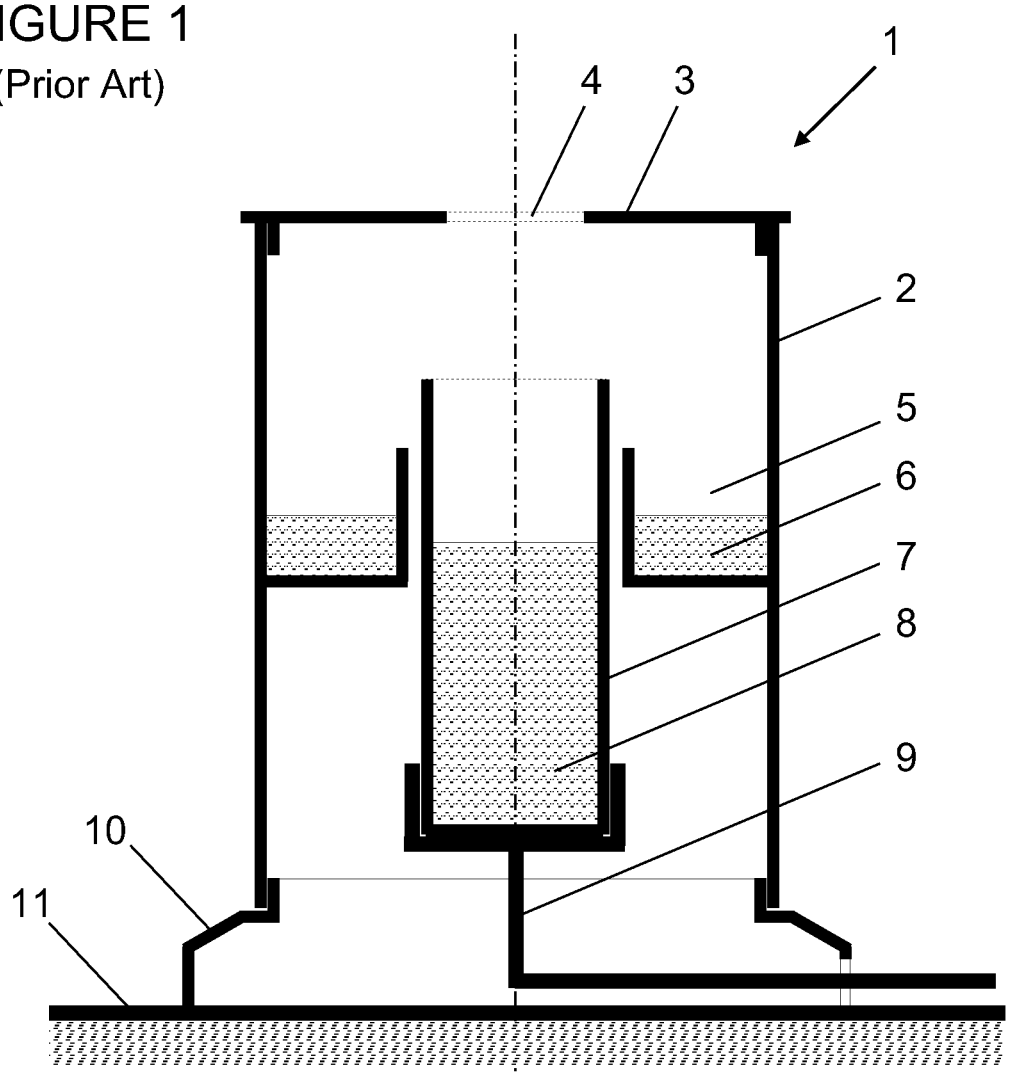
FIG. 1 illustrates the principal concept of an evaporation-trapping device of the existing state of the art in a schematic cross-sectional drawing.

A state-of-the-art evaporation-trapping device 1 for the gravimetric calibration and verification of laboratory pipettes is illustrated schematically in FIG. 1. This type of evaporation-trapping device, which is available commercially as an accessory kit to an analytical balance, includes a receiving vessel 7, a special load receiver 9 to support the receiving vessel 7, and an evaporation-trapping enclosure 2 with a ring-shaped, open tub 5, a lid 3 and a centering ring or support base 10.

To convert an analytical laboratory balance from general weighing duty to pipette calibration, the standard weighing pan and weighing pan carrier of the balance are uninstalled and replaced by the special load receiver 9. The support base or centering ring 10 is installed on the weighing compartment floor 11 of the balance. The evaporation-trapping enclosure 2 is set in place on the support base 10, the ring-shaped, open tub 5 is filled with water 6, the receiving vessel 7 is seated on the load receiver 9, and the lid 3 is placed on top of the evaporation-trapping enclosure 2. The reverse procedure is followed to convert the balance back to general weighing duty. As mentioned previously herein, the need to install and uninstall the evaporation trapping kit 1 every time the balance is switched between its normal laboratory weighing function and pipette calibration represents a serious drawback in laboratories where an analytical balance is not dedicated full-time to the process of performing pipette calibrations but has to be shared for other applications.

The assignee of the present invention manufactures an evaporation trap kit of the same principal type and with all of the components shown in FIG. 1, but with the further improvement that the receiving vessel 17 (see FIG. 2) is designed to keep at least part of the evaporation trapped inside the receiving vessel 17 which in this case includes a lid 13 and a receiving tube 18 passing through an opening in the lid 13 into the interior of the receiving vessel 17. The receiving vessel 17 is connected to the balance through a special load receiver 19 which is included in the evaporation trap kit. In the practical experience of users and in tests conducted by the applicant, this specific type of receiving vessel 17 was found to be so effective in reducing the rate of evaporation that the evaporation enclosure could be left off (and is therefore not shown in FIG. 2) without compromising the accuracy of the pipette calibration process. The steps of putting the evaporation trap enclosure in place over the receiving vessel 17 and filling the ring-shaped open tub of the evaporation trap enclosure with tap water can thus be dispensed with, but the exchange of the standard weighing pan against a special load receiver 19 for the receiving vessel is still cumbersome and undesirable for the user.

Figure 2:
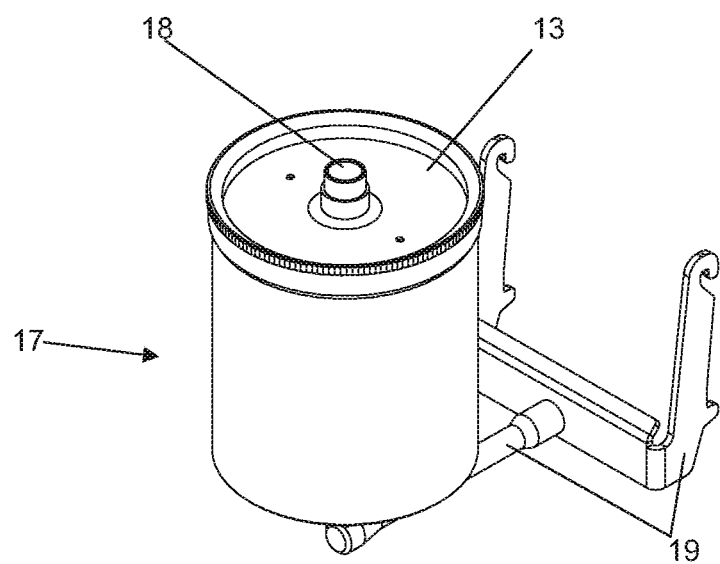
FIG. 2 illustrates a state-of-the-art receiving vessel which can be used without an evaporation-trapping enclosure
Figure 3:
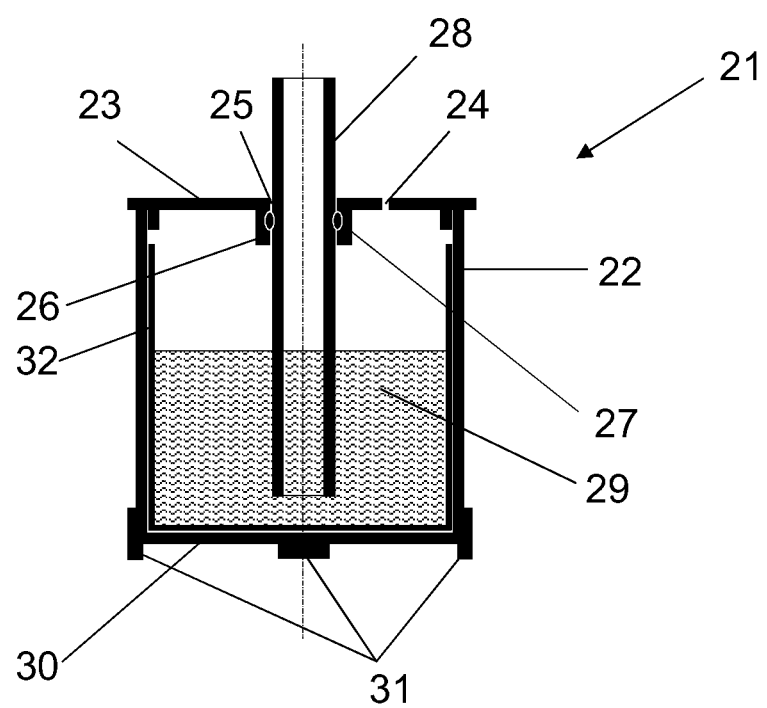
FIG. 3 illustrates the principal concept of an evaporation-trapping receiving vessel of the present invention in a schematic cross-sectional drawing.
Figure 4:
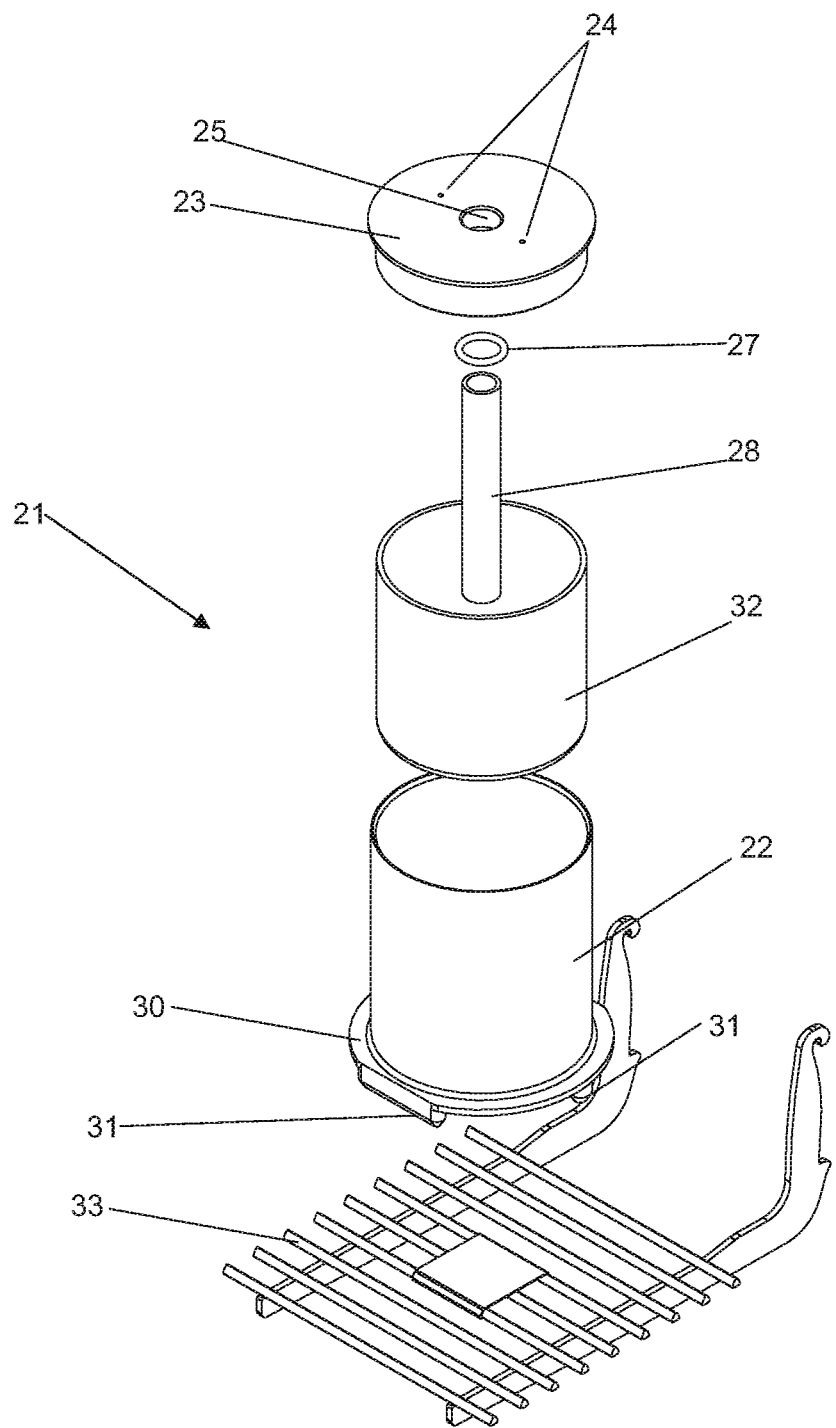
FIG. 4 shows an example of a practically realized example of an evaporation-trapping receiving vessel according to the present invention in an exploded view.
Figure 5:
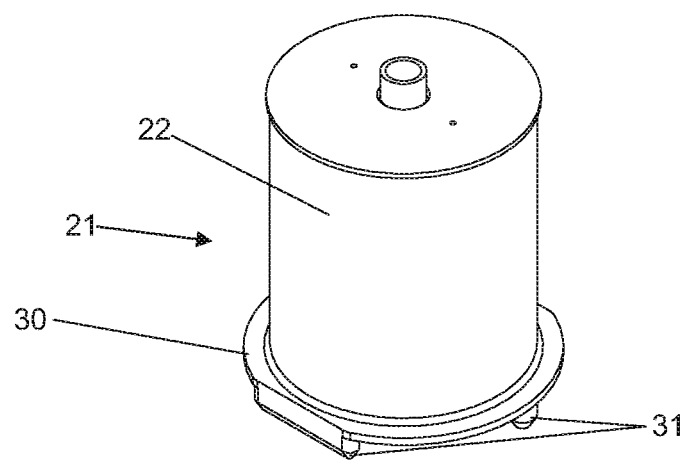
FIG. 5 shows (a) the receiving vessel of FIG. 4 in the assembled state; (b) the same receiving vessel upside down; and (c) an upside-down view of the engagement between the position-securing means and a grate-shaped load receiver.
Figure 5:
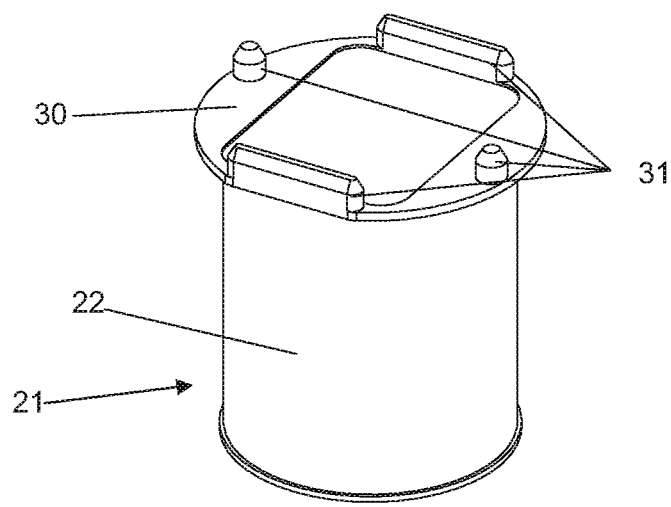
Figure 5:
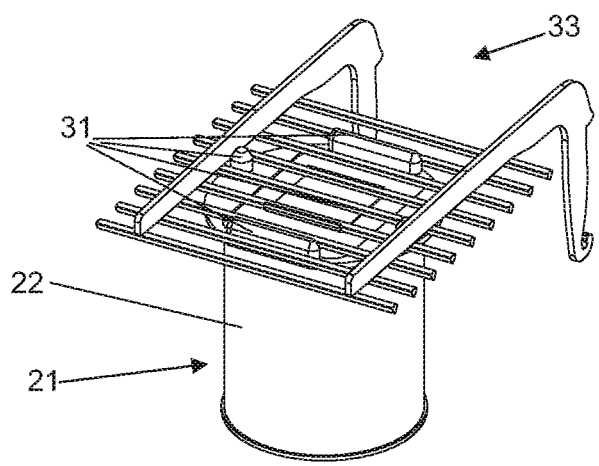
Figure 6:
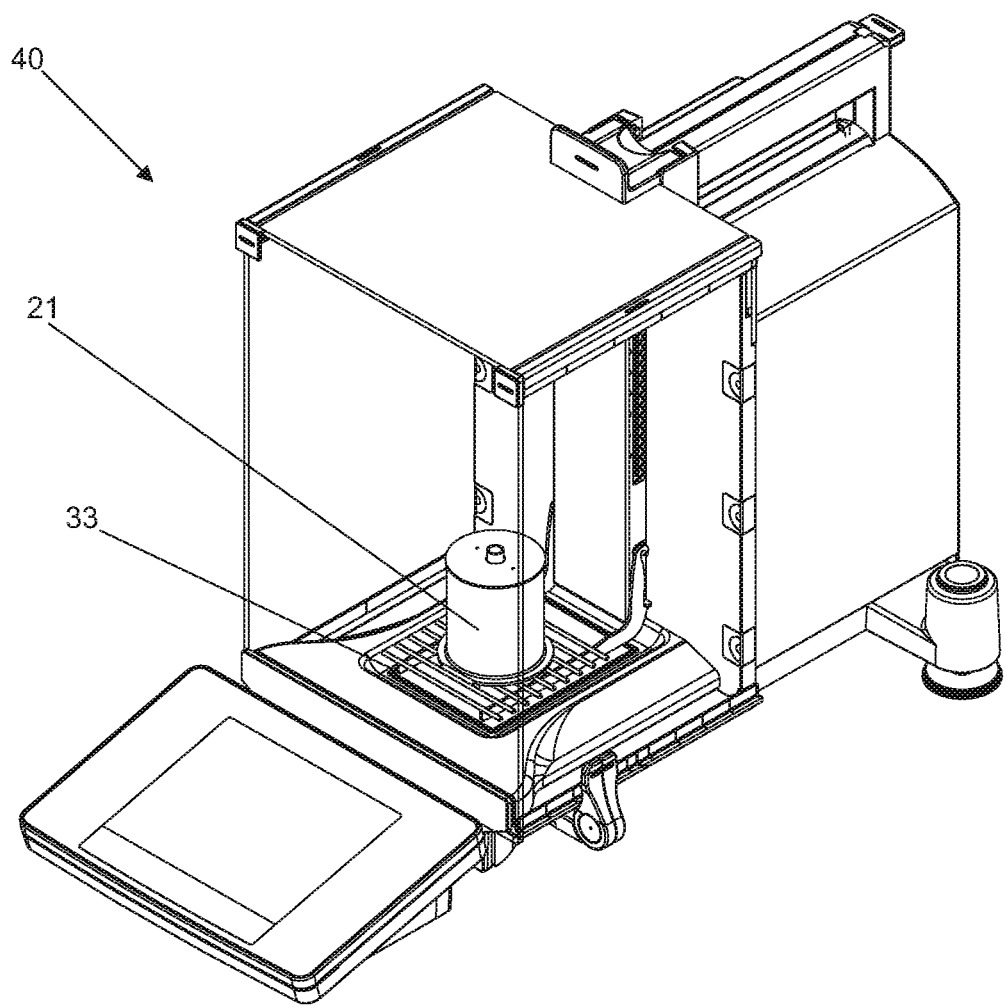
FIG. 6 shows an analytical balance with the evaporation-trapping receiving vessel of FIGS. 3 to 5.

FIG. 3 shows the principal concept and FIGS. 4 to 6 show a typical practical embodiment of an evaporation-trapping device of the present invention. Making use of the state of the art illustrated in FIG. 2, the evaporation-trapping device of the present invention 1 is simply embodied in the receiving vessel 21 with a beaker 22 and a lid 23, which has at least one vent hole 24 and a passage opening 25. The lid 23 incorporates a receiving tube 28, which may be formed integrally of one piece with the lid 23 or be firmly connected to the latter. In the illustrated example, the receiving tube 28 is seated in the collar flange 26 of the lid 23 with a tight friction fit by means of a seal ring 27. The receiving tube 28 is preferably transparent and extends far enough upward from the lid 23 that the tip of a pipette being discharged into the receiving tube remains fully visible to the operator. At the same time, the receiving tube 28 should descend far enough downward into the beaker 22 that the lower end of the receiving tube 28 is immersed in the test liquid 29 inside the receiving vessel 21.

However, in contrast to the state of the art of FIG. 2, the evaporation-trapping receiving vessel 21 of FIG. 3 is designed so that it can be securely seated on a standard grate-shaped load receiver 33 (see FIGS. 4, 5c, 6) of an analytical balance 40. Position-securing means 31 in the form of downward-projecting posts or ridges which are formed at the base 30 of the beaker 22 serve to engage the interstices of a grate-shaped load receiver 33 of an analytical balance 40 and to thereby ensure a secure placement of the receiving vessel 21 in a defined, reproducible position on the weighing pan or load receiver 33. The reproducible positioning of the receiving vessel 21 on the load receiver is of critical importance to prevent so-called eccentric load errors which could be caused by shifting the position of the receiving vessel 21 on the load receiver 33 during a pipette calibration.

In the embodiment of FIGS. 3 to 5, the beaker 22 is preferably made of a metal, for example aluminum, and is lined with a disposable or at least replaceable beaker insert 32 which protects the beaker 22 from being corroded by the test liquid 29, normally distilled water.

FIG. 4 shows a practically realized embodiment of the evaporation-trapping device 21 of FIG. 3 in an exploded view. The position-securing, downward-projecting ridges 31 at the base 30 of the beaker 22 are designed to fit into the gaps between the rods of a standard grate-shaped weighing load receiver 33 of an analytical balance of a type made by the assignee of the present invention.

FIG. 5 shows perspective views of the inventive evaporation-trapping receiving vessel 21 in the assembled state, (a) in upright orientation, (b) turned upside-down with posts and ridges 31 at the base 30 of the beaker 22 facing the viewer, and (c) turned upside-down with the posts and ridges 31 engaged in the interstices between the rods of of the aforementioned grate-shaped weighing load receiver 33.

FIG. 6 illustrates how a standard analytical balance 40 is made into a pipette calibration work station by placing an evaporation-trapping receiving vessel 21 of the present invention on the load receiver 33.

While the invention has been described through the presentation of a specific embodiment, it is considered self-evident that numerous additional variants are encompassed by the teachings of the present invention, for example by adapting the position-securing means to different kinds of standard load receivers or weighing pans, or by providing adapters between one standard design of the evaporation-trapping device and different kinds of standard load receivers or weighing pans. Such variations of the inventive concepts described and claimed herein fall clearly within the scope of protection that is hereby sought for the present invention.

What is claimed is:

1. A receiving vessel used to gravimetrically calibrate and verify pipettes on an analytical balance having a grate-shaped load receiver having a plurality of interstices, wherein the receiving vessel receives and holds a test liquid discharged from a pipette that is being calibrated or verified, the receiving vessel comprising:
    a beaker, having a base;
    a lid having a passage opening;
    a receiving tube, held in place in the passage opening to pass test liquid into an interior of the beaker; and
    a plurality of ridges or posts, arranged on the base of the beaker and projecting downwardly therefrom, for reproducibly securing the position of the beaker to the interstices, the thereby mechanical engaging the grate-shaped load receiver in a defined, reproducible position when the receiving vessel is set thereon;
    wherein the beaker, lid and receiving tube are arranged to trap evaporated test liquid.

2. The receiving vessel of claim 1, wherein at least one of the beaker and the lid are made of an electrically conductive material.

3. The receiving vessel of claim 2, wherein the electrically conductive material comprises aluminum.

4. The receiving vessel of claim 1, further comprising a liner insert for the beaker.

5. The receiving vessel of claim 1, wherein the receiving tube extends far enough downwardly into the beaker that a lower end of the receiving tube is immersed in the test liquid held inside the receiving vessel.

6. The receiving vessel of claim 5, wherein the lid has at least one vent hole that allows the escape of air that has been displaced by test liquid during a pipette calibration.

7. The receiving vessel of claim 1, wherein the receiving tube is formed as an integral piece of the lid.

8. The receiving vessel of claim 1, wherein the receiving tube is solidly joined to the lid.

9. The receiving vessel of claim 1, wherein the receiving tube is releasably connected to the lid.

10. The receiving vessel of claim 9, wherein a collar flange of the lid surrounds the passage opening, and a seal ring in the collar flange seals the receiving tube tightly in the lid.

11. The receiving vessel of claim 1, wherein the receiving tube is made of a transparent material.

12. The receiving vessel of claim 11, wherein the transparent material is glass.

13. A method for the gravimetrically calibrating and verifying the calibration of a pipette, comprising the steps of:
    providing a receiving vessel of claim 1,
    providing a balance having a grate-shaped load receiver designed to be mechanically engaged by a plurality of downwardly-projecting ridges on a base of the receiving vessel,
    placing the receiving vessel onto and engaging the load receiver in a defined, reproducible position,
    discharging a volume of test liquid from a pipette to be calibrated or verified into the receiving vessel,
    registering a weight difference of the receiving vessel, as measured by the balance before and after receiving the discharge of the volume of test liquid, and
    determining the volume of test liquid dispensed from the pipette into the receiving vessel, based on the registered weight difference and a known formula for converting the registered weight difference into a volume for the test liquid.

14. The receiving vessel of claim 1, wherein a collar flange of the lid surrounds the passage opening, and a seal ring in the collar flange seals the receiving tube tightly in the lid.

15. The receiving vessel of claim 1, wherein the receiving tube extends into the beaker in operation such that only a surface area of the test liquid equal to an internal cross-sectional area of the receiving tube is directly exposed to the ambient atmosphere.

* * * * *